(No Model.)
F. G. STARK.
NUT LOCK.
No. 600,097. Patented Mar. 1, 1898.
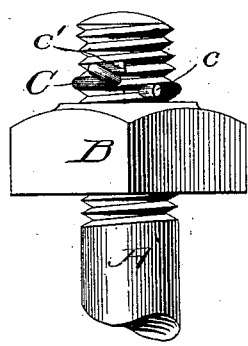
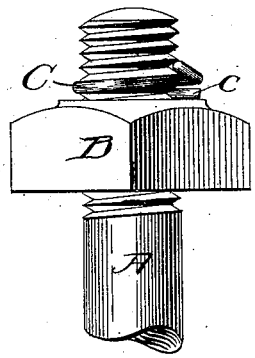
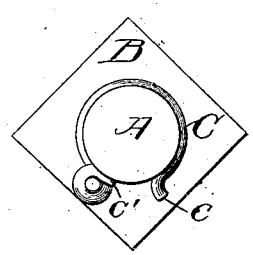
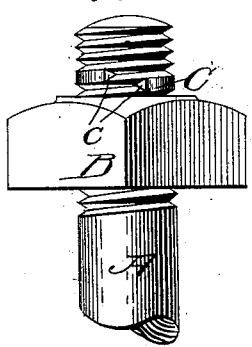
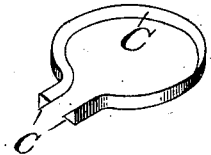
Witnesses:
F. R. Cornwall
Hugh N. Wagner
Inventor
Frank G. Stark
by Paul Bakewell
his atty

UNITED STATES PATENT OFFICE.

FRANK G. STARK, OF ST. LOUIS, MISSOURI.

NUT-LOCK.

SPECIFICATION forming part of Letters Patent No. 600,097, dated March 1, 1898.

Application filed December 21, 1895. Serial No. 572,872. (No model.)

*To all whom it may concern:*

Be it known that I, FRANK G. STARK, a citizen of the United States, residing at the city of St. Louis, State of Missouri, have invented a certain new and useful Improvement in Nut-Locks, of which the following is a full, clear, and exact description, reference being had to the accompanying drawings, forming part of this specification, wherein—

Figure 1 is a side elevational view of my improved nut-lock. Fig. 2 is a similar view. Fig. 3 is a top plan view. Fig. 4 is a side elevational view of a slightly-modified form of lock. Fig. 5 is a detail view of the same.

This invention relates to a new and useful improvement in nut-locks; and it consists, generally stated, in arranging a split spring-clip on the bolt, which clip tightly grasps or embraces said bolt, and by the friction caused by the grasp of the clip the nut is prevented from becoming loose.

The invention further consists in the construction, arrangement, and combination of the several parts, all as will hereinafter be described, and afterward pointed out in the claims.

In the drawings, A indicates a bolt, and B a nut, such parts being of any ordinary or approved construction.

C indicates a "split clip," as I have termed it, such clip being in the form of an open ring of either circular or non-circular cross-section. As shown in Fig. 5, it will be seen that the ends of this ring are on the same plane before the ring is forced on the bolt, and, as shown in Fig. 4, when the ring is forced on the bolt it is distorted—that is, the ring, assuming the path of the valley of the threads, has its ends separated, one being above and the other below their normal position, which subjects the ring to a torsional strain when in position. This ring is adapted to fit between two threads of the bolt and be screwed in position up against the outer face of the nut after said nut has been screwed home. This ring is preferably composed of spring metal, and its diameter is such that when being placed on the bolt its ends have to be separated somewhat, so that when in position it tightly clasps the bolt and remains in position, where it is placed by its own impingement.

To afford a ready means for turning the clip on the bolt, I bend one or both of its ends *c* outwardly, as shown.

The operation of such a nut-lock is very simple. When in position against the outer face of the nut, it will effectually hold the nut in place, as it is impossible to revolve the clip around the bolt, except by the individual application of a wrench thereto, and the only way to dislodge the clip is to force its ends step by step over the threads longitudinally the bolt. This step-by-step movement of the ends of the rings is consequent upon the pitch of the threads of the bolt and the position of the ends of the ring between the threads. An inspection of Fig. 1 or 4 will show that when the nut is unscrewed it first contacts with the end of the ring nearest to it, and as said ring will not revole, due to the great friction with the threads and the slight friction with the bolt by contacting therewith at one point only, its end will be forced over the thread. While the ring is in this position, it straddles one thread. A further movement of the nut in the same direction will force the other end of the ring over the thread, whereby said ring resumes its normal position on the bolt—*i. e.*, having a continuous contact with the threads. It will thus be seen that to remove the nut from the bolt it is necessary to alternately advance the ends of the ring the distance of one thread step by step, and such advance movement will not only necessitate overcoming torsional resistance, but frictional contact as well, which latter resistance is appreciably increased by the tightness of the ring due to its diameter and the spring metal of which it is composed.

From the above it will readily be seen that when a nut is screwed home and the ring is placed in position against the nut the ring cannot become loose by reason of its tight grasp between the threads of the bolt, and even should the nut be loose its movement longitudinally the bolt will be checked because the resistance offered by the ring is far in excess of the power necessary to prevent the nut from revolving. Again, in most all instances where bolts or nuts are used the cause of loose nuts is due to the unequal pressure on the nut in a direction longitudinally the bolt. When this strain is removed, the nut settles in its new position, and when pressure is applied again it is directed against the nut in such new position. Therefore it will be noted that all rotary movement of the nut occurs during a relaxation of pressure, and this being true the only pressure brought to bear against the ring is the weight of the nut itself.

To further increase the resistance of the ring in a direction longitudinally the bolt and at the same time prevent a backward rotary movement, I rebend one end of said ring and place the end $c'$ in the next adjacent groove beyond the nut, straddling one thread. This rebent end presents a biting edge which prevents a backward rotary movement and also offers additional frictional resistance to be overcome when that end of the ring is forced over the threads, as in unscrewing the nut by the application of intentional rotary power.

Having thus described my invention, what I claim, and desire to secure by Letters Patent, is—

1. As a new article of manufacture, an open ring which is adapted to fit between the threads of a bolt, said ring having a rebent portion terminating in a biting edge which is adapted to straddle a thread and prevent a backward rotary movement of the ring; substantially as described.

2. A nut-lock consisting of a piece of spring metal formed into a single ring the inner edge of which is fashioned to fit between the threads of a bolt, the respective portions of the ring being normally parallel, and adapted to be deflected when applied to the bolt, and the ends of the metal piece being bent outward, substantially as described.

In testimony whereof I hereunto affix my signature, in presence of two witnesses, this 16th day of December, 1895.

FRANK G. STARK.

Witnesses:
F. R. CORNWALL,
HUGH K. WAGNER.